United States Patent [19]
Lee et al.

[11] Patent Number: 5,425,119
[45] Date of Patent: Jun. 13, 1995

[54] CONNECTOR STRAIN RELIEF FOR OPTICAL FIBER

[75] Inventors: Nicholas A. Lee, Woodbury; Gordon D. Henson, Lake Elmo, both of Minn.

[73] Assignee: Minnesota Mining and Manufacturing Company, Saint Paul, Minn.

[21] Appl. No.: 125,563

[22] Filed: Sep. 23, 1993

[51] Int. Cl.⁶ .................................. G02B 6/44
[52] U.S. Cl. .......................... 385/86; 385/76; 385/77; 385/78; 385/81; 385/87; 385/139
[58] Field of Search .......... 385/60, 62, 64, 66, 385/69, 70, 72, 76, 77, 78, 81, 82, 84, 85, 86, 87, 139

[56] References Cited
U.S. PATENT DOCUMENTS

| | | | |
|---|---|---|---|
| 4,148,557 | 4/1979 | Garvey | 385/87 x |
| 4,447,121 | 5/1984 | Cooper et al. | 385/87 X |
| 4,668,045 | 5/1987 | Melman et al. | 385/82 X |
| 4,679,895 | 7/1987 | Huber | 385/87 X |
| 4,725,118 | 2/1988 | Serrander | 385/82 X |
| 4,773,725 | 9/1988 | Ashman et al. | 385/87 X |
| 4,838,641 | 6/1989 | Morimoto et al. | 385/87 X |
| 4,930,856 | 6/1990 | Pelta | 385/87 X |
| 4,984,865 | 1/1991 | Lee et al. | 156/327 X |
| 5,062,683 | 11/1991 | Grois et al. | 385/87 |
| 5,140,661 | 8/1992 | Kerek | 385/81 |
| 5,142,602 | 8/1992 | Cabato et al. | 385/87 |
| 5,166,997 | 11/1992 | Norland et al. | 385/87 |
| 5,202,942 | 4/1993 | Collins et al. | 385/87 |
| 5,222,169 | 6/1993 | Chang et al. | 385/87 |
| 5,224,187 | 6/1993 | Davisdon | 385/87 |
| 5,321,784 | 6/1994 | Cubukciyan et al. | 385/78 |

Primary Examiner—Brian Healy
Attorney, Agent, or Firm—Gary L. Griswold; Walter N. Kirn; Stephen W. Buckingham

[57] ABSTRACT

A fiber optic connector includes a collapsible crimp ring, a rigid strain relief member, and a deformable strain relief member. The rigid strain relief member, in conjunction with the crimp ring, will grip protective filaments from an optical fiber cable if they are available. The deformable strain relief member will grip a buffered optical fiber when deformed by the crimp ring.

7 Claims, 3 Drawing Sheets

CONNECTOR STRAIN RELIEF FOR OPTICAL FIBER

BACKGROUND OF THE INVENTION

Optical fibers are commonly provided in protective cables. Inside these cables the fibers are often surrounded by protective filaments. Such protective filaments may be of a material such as an arimide. Such filaments provide multiple forms of protection to the fiber. Besides providing mechanical protection to the fiber inside the cable, they may be used to provide strain relief when the fiber emerges from the cable and is inserted into a connecter.

Such strain relief is required to isolate the fiber which is typically firmly held, either by an adhesive or a mechanical clamp, at the front of the connector, i.e., the end of the connector where the fiber terminates from mechanical stress. Strain relief is achieved by mechanically clamping the protective filaments to the connector.

Increasingly current designs utilize cables with no protective filaments. The fiber in such cables is protected solely by its protective buffer and the cable material itself. While this is proving to provide adequate protection of the fiber in the cable, it removes the possibility of using the protective filaments for strain relief at the connector. As a result, strain relief is provided by providing a clamping system at the back of the connector that will grip the fiber. While this provides adequate strain relief, it presents the problem that two different types of connectors are required. A desirable connector would be able to provide strain relief to fibers regardless of whether the cable in which they are contained utilize protective filaments.

SUMMARY OF THE INVENTION

A fiber optic connector according to the present invention uses a collapsible crimp ring, a rigid strain relief member, and a deformable strain relief member. The rigid strain relief member, in conjunction with the crimp ring, will grip protective filaments from an optical fiber cable if they are available. The deformable strain relief member will grip a buffered optical fiber when deformed by the crimp ring.

DETAILED DESCRIPTION OF THE PREFERRED EMBODIMENTS

Figure 1:
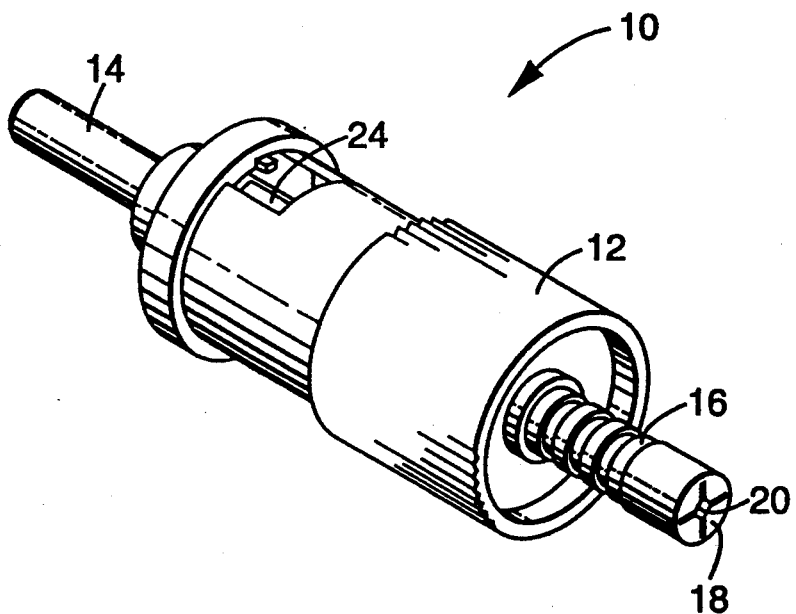
FIG. 1 is a perspective view of a fiber optic connector according to the invention.

As shown in FIG. 1, an optical fiber connector, 10, includes a bayonet connector cover, 12, a ferrule, 14, and a rigid strain relief member, 16. Inserted into rigid strain relief member 16 is a flexible strain relief member, 18. A connector body, preferably integral with rigid strain relief member 16, underlies bayonet cover 12 and cannot be seen in FIG. 1.

Bayonet cover 12 is generally of either a metal or a plastic material. Ferrule 14 is generally either of a plastic or a ceramic material, although metal ferrules are also used. As shown ferrule 14 is cylindrical, like the ferules used in "ST" and "SC" connectors, although any a ferrule of any shape will work with the invention. For example, ferrule 14 could instead be a truncated cone such as is used in a biconic connector. Rigid strain relief member 16 is generally of a hard plastic, although any rigid material will work. Deformable strain relief member 18 is generally of a flexible plastic material such as low density polypropylene. As will become apparent later, it is important that deformable strain relief member 18 have a greater diameter than rigid strain relief member 16. A bore 20 runs through deformable strain relief member 18, rigid strain relief member 16, the connector body, and ferrule 14.

Figure 2:
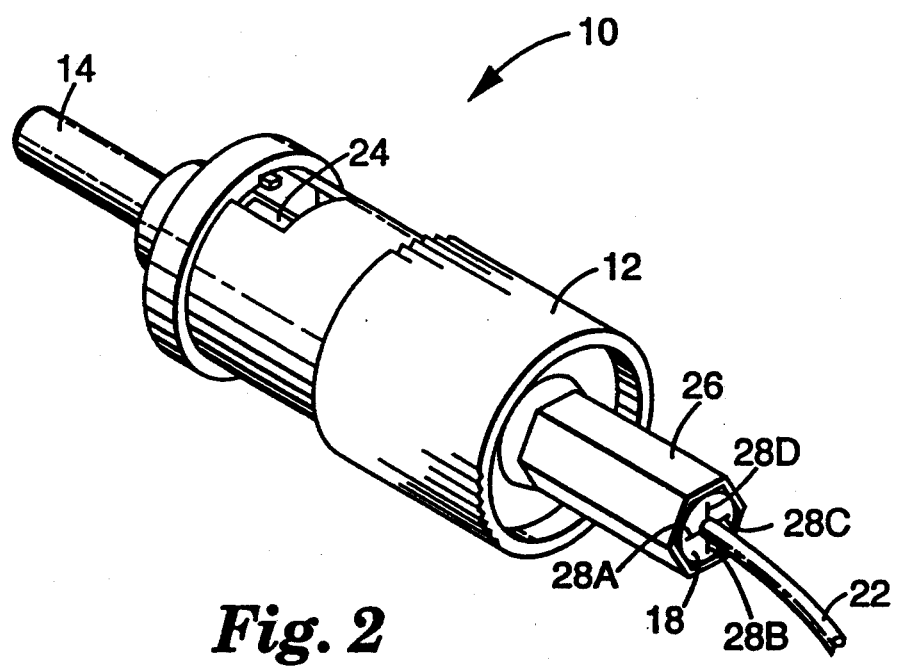
FIG. 2 is a perspective view of a fiber optic connector according to the invention with a fiber that is not protected by filaments installed.

As shown in FIG. 2, an optical fiber, 22, is inserted in bore 20. Typically optical fiber 22 is slid all the way through bore 20 so that its end face is flush with the end face of ferrule 14 and its protective buffer extends into deformable strain relief member 18. The fiber is fastened in place by any of a variety of means. The most commonly used method is an epoxy adhesive. Alternatively, as described in commonly assigned U.S. Pat. No. 4,984,865, a hot melt adhesive may be used. The connector shown in FIG. 2 includes apparatus 24 for mechanically clamping a fiber in the connector. Clamping apparatus 24 is more fully described in U.S. patent application Ser. No. 07/871,399, filed Apr. 21, 1992, pending.

After the fiber has been attached to connector 10, either adhesively or by mechanical clamping, crimp ring 26 is collapsed. The use of the term "crimp ring" should not be taken to imply that it must be round. Crimp ring 26 is preferably of a metal such as aluminum. When crimp ring 26 collapses, it causes deformable strain relief 18 to be collapsed as well. The presence of slots 28A, 28B, 28C, and 28D in the deformable strain relief member 18 help it to collapse in an even manner. Slots 28A, 28B, 28C, and 28D are not required for proper operation of the invention but generally will provide superior performance. Deformable strain relief member 18 and crimp ring 26 are sized such that deformable strain relief 18 will tightly grip a buffered optical fiber after collapse. Deformable strain relief member 18 must be substantially greater in diameter than rigid strain relief member 16 in order to insure that rigid strain relief member 16 not interfere with the collapse of deformable strain relief member 18.

Figure 3:
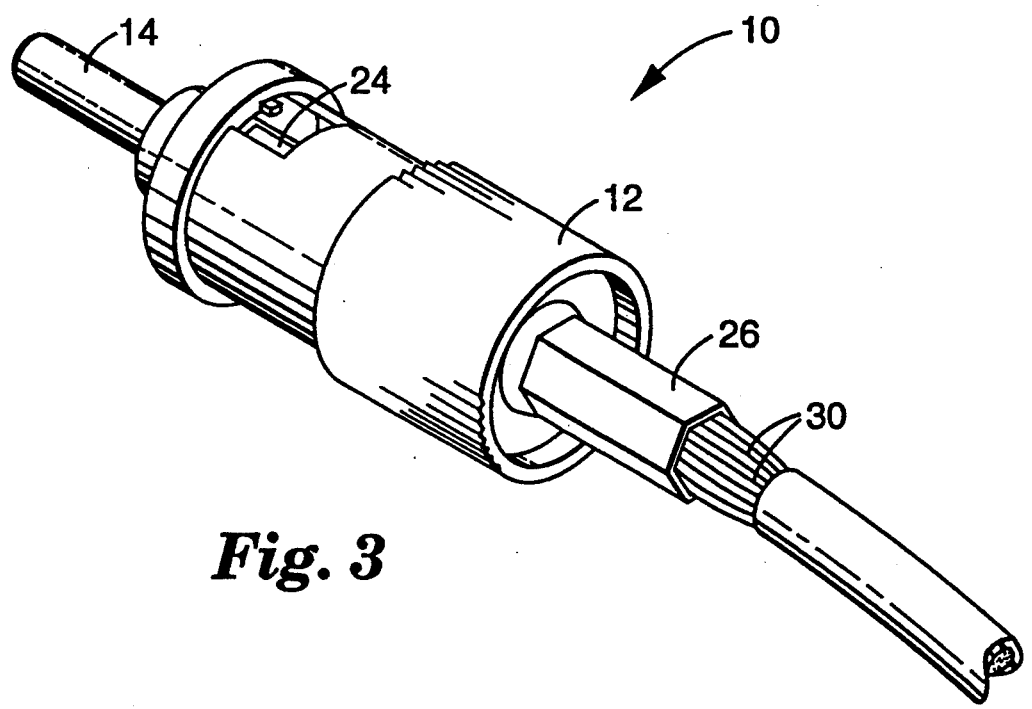
FIG. 3 is a perspective view of a fiber optic connector according to the invention with a fiber that is protected by filaments installed.

FIG. 3 shows the optical fiber connector of the invention utilized in conjunction with an optical fiber that is sheathed with a protective material such as arimide filaments. A commonly used protective material is sold under the trademark "Kevlar" by E. I. dupont de Nemours. Just as before, the fiber is inserted through bore 20 and fastened in connector 10. When connector 10 is used with a fiber with protective filaments, however, those filaments, 30, are inserted into the gap between crimp ring 26 and rigid strain relief member 16 and flexible strain relief member 18 prior to the collapse of crimp ring 26. When crimp ring 26 is collapsed, protective filaments 30 are held tightly between crimp ring 26 and rigid strain relief member 16. As shown in FIG. 1, rigid strain relief member 16 may be provided with a series of ridges and grooves in order to cause it to more tightly hold protective filaments 30. As may be seen, a connector according to the invention may be used with fibers that are filament protected as well as those that are not with no change in parts.

Figure 4:
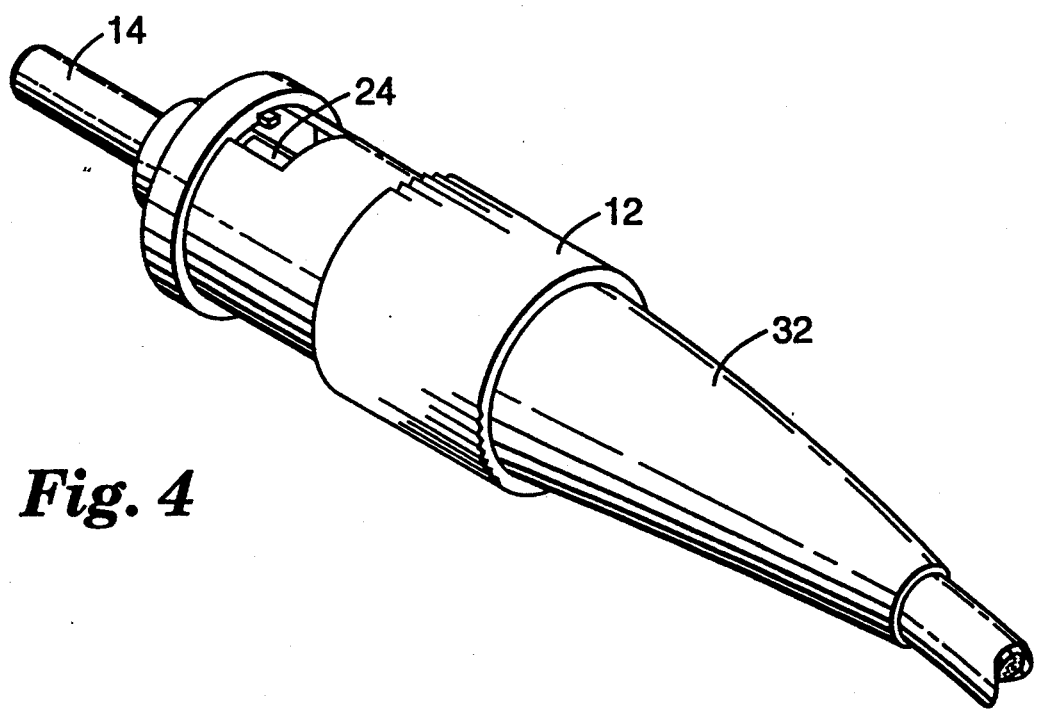
FIG. 4 is a perspective view of a fiber optic connector according to the invention with a protective boot in place.

As shown in FIG. 4, the fiber may be further protected by adding a protective boot, 32, over crimp ring 26 and strain relief members 16 and 18. Such a protective boot may be used with either a buffered fiber without protective filaments, as shown in FIG. 2, or a fiber with protective filaments as shown in FIG. 3.

Figure 5:
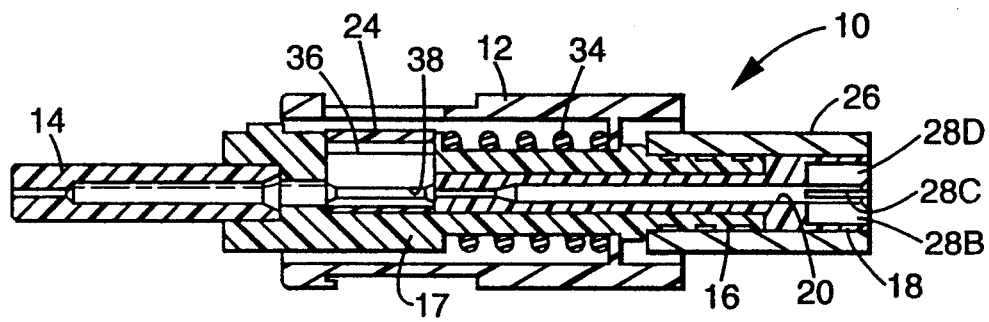
FIG. 5 is a schematic cross-sectional view of a fiber optic connector according to the invention.

FIG. 5 is a cutaway side view of a connector for optical fibers according to the invention. As shown, connector 10 includes bayonet cover 12. As may be seen, rigid strain relief member 16 is integral with connector body 17 and extends all the way through bayonet cover 12 and holds ferrule 14 in place. Deformable strain relief member 18 is inserted into rigid strain relief member 16 and locked in place. Crimp ring 26 encircles a portion of rigid strain relief member 16 and a portion of flexible strain relief member 18.

In addition, although not related to the present invention, FIG. 5 shows a spring 34. Spring 34 is required to comply with standards in order to make the fiber optic connector according to the invention compatible with other connectors. FIG. 5 also shows clamping element 36, which is engaged by depressing clamping apparatus 24 of FIG. 2. Clamping element 36 includes a pair of grooves that, when clamping element 36 is engaged, form a bore 38 in alignment with bore 20. Optical fiber 22 of FIG. 2 is pinched in bore 38 and held in place in connector 10.

Figure 6:
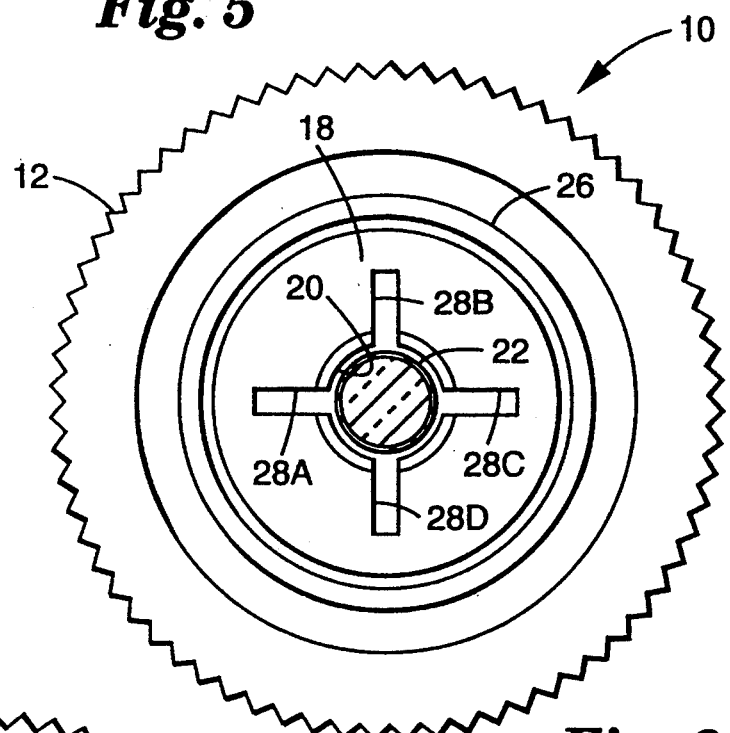
FIG. 6 is a rear view of a fiber optic connector according to the invention prior to collapse of the crimp ring.

FIG. 6 shows a end view of connector 10 prior to the collapse of crimp ring 26. As shown in FIG. 6, deformable strain relief member 18 has a bore 20 with optical fiber 22 inserted therein. As previously described, deformable strain relief member 18 has slots 28 to insure that it deforms in the manner intended.

Figure 7:
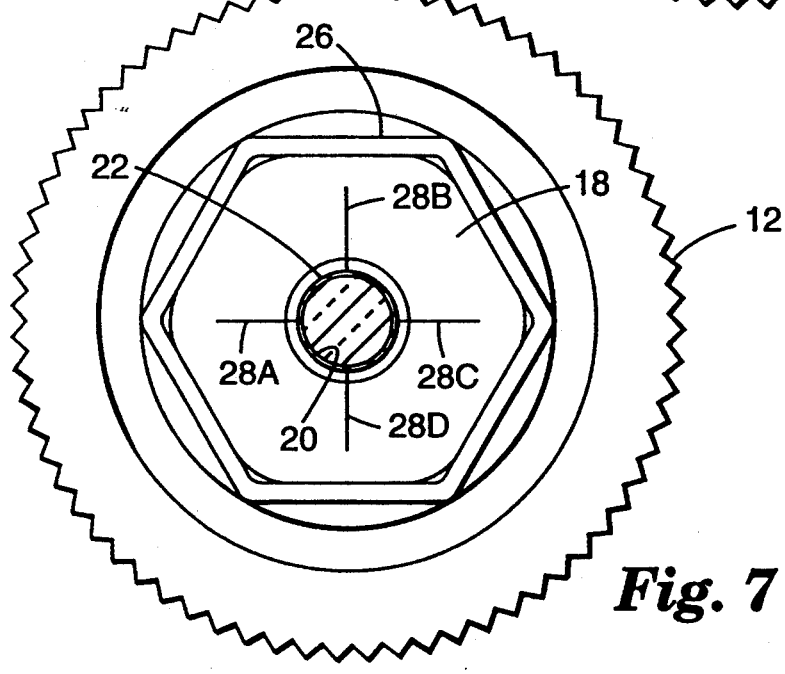
FIG. 7 is an end view of a fiber optic connector according to the invention after the collapse of the crimp ring.

FIG. 7 is the same view as FIG. 6 following the collapse of crimp ring 26. As may be seen, deformable strain relief member 18 is fully collapsed and now tightly holds fiber 22. If the fiber shown in FIG. 7 had come from a cable including protective filaments, those filaments would be pinched between crimp ring 26 and flexible strain relief member 18.

What is claimed is:

1. A fiber optic connector comprising:
    a collapsible crimp ring;
    a rigid strain relief member for, in conjunction with said crimp ring, gripping protective filaments from a fiber optic cable; and
    a deformable strain relief member for gripping a buffered optical fiber when deformed by said crimp ring.

2. The fiber optic connector of claim 1 wherein said deformable strain relief member has a plurality of slots therein.

3. The fiber optic connector of claim 1 wherein said deformable strain relief member is of polypropylene.

4. The fiber optic connector of claim 3 wherein said deformable strain relief member has a plurality of slots therein.

5. The fiber optic connector of claim 1 wherein said deformable strain relief member has a diameter greater than that of said rigid strain relief.

6. The fiber optic connector of claim 1 further comprising a cylindrical ferrule.

7. The fiber optic connector of claim 1 further comprising a protective boot covering said crimp ring and said strain relief members.

* * * * *